July 3, 1928.                                                                          1,675,364
G. LOECK
OPTICAL APPARATUS FOR EXAMINING CAVITIES AND TUBES IN THE BODY
Filed March 26, 1927
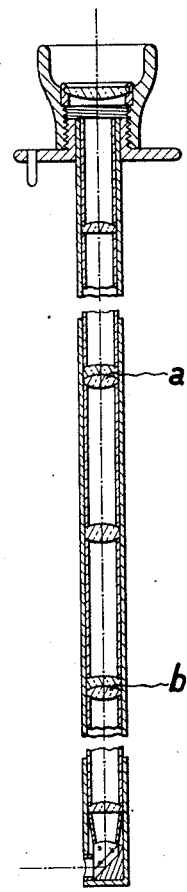
Inventor:
Günther Loeck Patented July 3, 1928.

1,675,364

UNITED STATES PATENT OFFICE.

GÜNTHER LOECK, OF BERLIN, GERMANY, ASSIGNOR TO THE FIRM GEORGE WOLF G. M. B. H., OF BERLIN, GERMANY.

OPTICAL APPARATUS FOR EXAMINING CAVITIES AND TUBES IN THE BODY.

Application filed March 26, 1927, Serial No. 178,797, and in Germany March 30, 1926.

The light filters of optical apparatus for examining cavities and tubes in the body (e. g. of cystoscopes and gastroscopes) have hitherto been constructed in various ways. One has, for instance, used plane-parallel, coloured glass plates as filters or dyed layers of gelatine applied to glass, or one has also constructed single lenses as filters by imparting to them a corresponding colour.

According to the present invention one uses as filters layers of cement of cemented members of the optical system. This kind of filtering has the advantage that it does not require any special optical element because the optical apparatus concerned, unless they are to be too imperfect, are e. g. always provided with cemented lenses, so that it is only necessary to use a correspondingly dyed cement instead of the colourless cement hitherto used. Besides, these filters are exempt from the drawback peculiar to coloured lenses, viz, that the filtering layer varies in thickness at different places.

The annexed drawing shows as a constructional example in a section an inner tube of a cystoscope, constructed according to the invention in which the single members of two lenses $a$ and $b$ are cemented with each other by means of dyed Canada balm.

I claim:

Optical apparatus for examining cavities and tubes in the body, containing optical elements, adapted to present to the observer an image of the part to be examined, at least one of these elements consisting of two lenses, united by means of dyed cement.

GÜNTHER LOECK.